Sept. 17, 1957 J. E. GAMMIE 2,806,572
PLANTER
Filed July 26, 1955

INVENTOR
JOHN E. GAMMIE
ATTORNEY

United States Patent Office 2,806,572
Patented Sept. 17, 1957

2,806,572
PLANTER

John E. Gammie, Waterloo, Iowa, assignor to International Harvester Company, a corporation of New Jersey Application July 26, 1955, Serial No. 524,543

4 Claims. (Cl. 193—9)

This invention relates to agricultural implements and particularly to planters. More specifically, the invention concerns improved valve means for the dispensing apparatus of a seed planter.

The present invention is particularly adaptable to corn planters of the hill-drop type wherein a vertical discharge tube receives the seed from the planter hopper and a valve is provided at the outlet having a gate which catches and accumulates several seeds which are periodically ejected as a group from the outlet of the seed tube into the furrow formed by the furrow opening tool. The valve which collects and ejects the seed is operated between open and closed positions at intervals regulated by the ground speed of the planter, and in a hill-drop planter of the type with which this invention is concerned, conventional means are provided for opening and closing of valve.

When corn planters were propelled at low speed by horses and slow moving tractors, the operation of the valving mechanism and the deposition of seed in the ground was relatively uniform. However, seed from the hopper falls a considerable distance before it reaches the ejecting valve at the bottom of the seed tube and, in recent years, as the planting process has speeded up with the increased speed of tractors, irregularities have been observed in the planting process. For instance, the falling of the seed has not kept pace with the rate of opening and closing of the ejecting valve so that there has been considerable variation in the number of seeds collected to be discharged into a hill.

Therefore, an object of the invention is the provision of improved valving mechanism for a planter particularly designed for high speed operation, the construction of which is simple and economical.

Another object of the invention is the provision of improved planter valving mechanism designed to provide uniform deposition of seed.

A further object of the invention is the provision of an improved planter of the type having an oscillating seed tube which is swingable in a vertical plane within the housing of the discharge mechanism, wherein novel three-stage valving apparatus is provided including a lower ejecting valve, an upper valve, and an intermediate or middle valve, all of which are actuated by the swinging of the seed tube.

Other objects and advantages of the invention will become clear from the following detailed description when read in conjunction with the accompanying drawings wherein.

Figure 2:
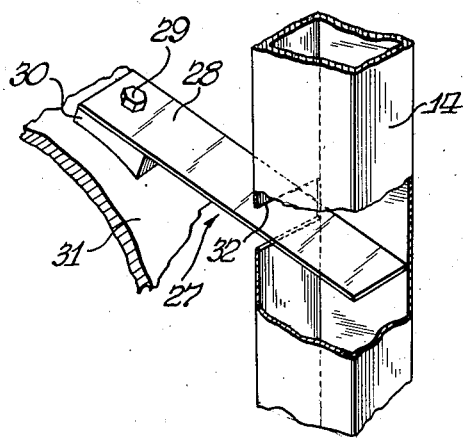
Figure 2 is an enlarged detail in section and in perspective showing the relationship of the middle or auxiliary valve apparatus to the seed tube.

Referring to the drawings, the seed boot is designated by the numeral 10, and mounted thereupon is the seed hopper 11. The housing 10 is generally rectangular in section and has secured to its lower end a furrow opener 12.

Seed from hopper 11 passes through an inlet valve 13 into the upper end of a vertically extended elongated seed tube 14 which, as indicated in Figure 2, is rectangular in section. Seed entering the upper end of tube 14 falls by gravity to the outlet 15 at the bottom of the tube and falls through a suitable opening provided in the furrow opener 12 and is deposited in the furrow formed thereby.

It may be understood that the seed boot 10 and the hopper 11 may be one of several planter units mounted upon a conventional planter frame, which forms no part of this invention, and it may be understood that the improved valve apparatus of this invention is actuated by a conventional check wire of the type customarily used with check-row planters. Ordinarily, seed falling by gravity from valve 13 through the tube 14 falls upon the gate valve 16 shown in its closed position in Figure 1, and this valve is opened at regular intervals to discharge the seed accumulated thereon.

Gate valve 16 is mounted upon a triangular bracket 17 pivotally mounted at 18 upon the seed tube 14, and at 19 upon the housing 10 between the side walls 20 and 21 thereof. Movement of the valve 16 from the closed position of Figure 1 to the open position of Figure 3 to discharge the seed accumulated thereby is accomplished by the oscillation or swinging of seed tube 14 in a vertical plane.

The operation of the seed tube to actuate the valve 16 is accomplished by conventional valve actuating means, not shown, of a well-known type customarily utilized in the operation of corn planters. The rocking of a shaft, also not shown, transmits its motion through a connecting rod 22 to a bracket 23 in the form of a bell crank fulcrumed at 24 between the sides 20 and 21 of the housing 10, and having an arm 25 pivotally connected at 26 to the upper end of the seed tube 14. Reciprocation of connecting rod 22 rocks the bell crank 23 and it vertically moves seed tube 14 downwardly from the position of Figure 1 to the position of Figure 3. It will also be noted that this vertical swinging of the seed tube 14 also rocks bell crank 17 carrying the gate valve 16, and that this motion of the seed tube also includes some horizontal movement thereof, as shown in the drawing.

Figure 1:
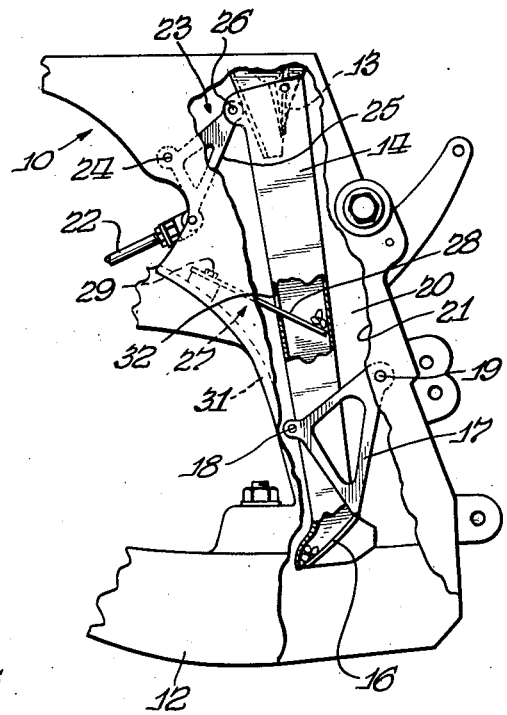
Figure 1 is an enlarged view, partly in section, of a seed boot or housing showing the improved seed tube and valving apparatus of this invention with the valves in closed position.

Under slow speed operation of the planter, seed would ordinarily fall by gravity from valve 13 upon the lower gate valve 16 as indicated in Figure 1 and be discharged therefrom in uniform amounts and at regular intervals. However, under modern high speed planting conditions, the speed of opening and closing of the valves 13 and 16 is greatly increased while the rate at which the seeds fall through the tube 14 remains substantially the same. Under these conditions there is little uniformity in the number of seeds pocketed by the gate valve 16 and discharged thereby. To overcome this obstacle applicant has provided an intermediate or auxiliary valve means, disposed medially of the ends of the tube and designed to provide a three-stage valve operation which minimizes the dependence upon gravity in the passage of seed through the tube 14, and this valve means is indicated by numeral 27. Valve means 27 comprises a strip of sheet metal 28 mounted by means of a bolt 29 upon a block 30 affixed to a flange 31 connecting the forward ends of the walls 20 and 21. The other end of the valve element 28 is slidably received in a rectangular opening 32 provided in the forward wall of the seed tube 14. The member 28 extends downwardly and rearwardly into the seed tube 14, and in Figure 1 it is shown in its closed position corresponding to the closed position of lower valve member 16, with the metal strip or element 28 extending through the opening 32 to the opposite wall of the seed tube and substantially closing the passageway therethrough.

Figure 3:
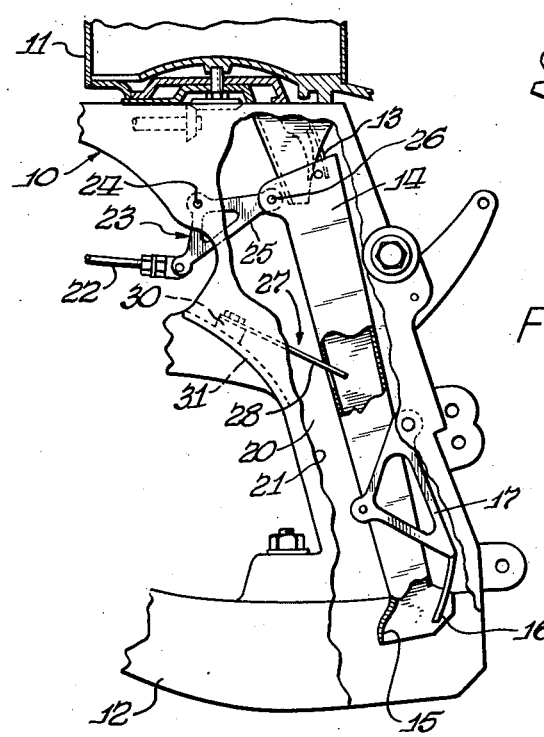
Figure 3 is a view similar to Figure 1, schematically illustrating in section the relationship of the seed hopper to the seed boot, and showing the valves in open position.

It will be noted in Figures 1 and 2 that the swinging of tube 14 in a vertical plane includes horizontal movement from the position of Figure 1 to the position of Figure 3 wherein the tube has swung rearwardly away from the valve element 28 to allow the seed pocketed by the valve element 28 to fall by gravity to the lower gate 16. The valves 13, 16 and 27 thus open and close in unison by the oscillation of tube 14. The novel middle valve arrangement of this invention breaks the long fall of the seed from the valve 13 to the gate valve 16 at the bottom of the tube and permits the seed to be collected and ejected therefrom in uniform quantities.

From the foregoing it should be clear that a novel valve mechanism has been provided for controlling the discharge of seed from a seed hopper to the ground in high speed planting operations. The invention has been described in its preferred embodiment. However, it should be understood that modifications may be made in the invention without departing from the spirit thereof or the scope of the appended claims.

What is claimed is:

1. In a planter comprising a housing, a vertically elongated seed tube mounted in the housing for swinging movement in a vertical plane and forming a passageway through which seed or the like is discharged from a supply source for deposition in the ground, the combination of valve means adjacent the supply source, valve means at the lower end of the tube to receive and discharge seed received from the upper valve, and middle valve means associated with the tube medially of the ends thereof actuated by the movement of said tube and arranged to receive seed from the upper valve and discharge it to the lower valve.

2. The invention set forth in claim 1, wherein said middle valve means includes the provision of an opening in the wall of the seed tube, and a valve element having a width substantially equal to the diameter of the tube is secured to the housing and is slidably received in said opening, said middle valve means being opened and closed by the swinging of said tube.

3. In a planter comprising, a vertically elongated seed tube forming a passageway through which seed or the like from a supply source falls by gravity for deposition in the ground and including means for periodically swinging said tube generally vertically, an upper valve at the supply source, a valve member mounted on the lower end of said tube upon which seed falls by gravity and actuated by the swinging of the tube to move the valve periodically from a closed to an open position to discharge seed from the tube, and a middle valve element in the seed passageway medially of the ends of said tube in the path of the seed, said middle valve element being actuated by the swinging of the tube from a closed position to an open position to discharge seed to said lower valve member.

4. In a planter comprising a housing and a vertically elongated seed tube mounted in the housing by means accommodating swinging thereof in a vertical plane relative to the housing and forming a passageway through which seed or the like from a supply source is discharged for deposition in the ground, the combination of a valve element mounted stationarily in said housing and extending generally transversely with respect to said tube, said tube having an opening formed therein intermediate its ends to slidably receive said valve element, and the swinging of said tube including transverse oscillation relative to said valve element from an open position of the tube to a closed position with the valve element extending across and substantially closing said tube.

References Cited in the file of this patent

UNITED STATES PATENTS

| | | |
|---|---|---|
| 1,287,711 | Lichtenberg | Dec. 17, 1918 |
| 1,743,939 | Thomas | Jan. 14, 1930 |
| 2,668,648 | Carlsen | Feb. 9, 1954 |